United States Patent [19]

Omori

[11] Patent Number: 4,825,300
[45] Date of Patent: Apr. 25, 1989

[54] MAGNETIC VIDEO RECORDING SYSTEM AND METHOD WITH HORIZONTAL SYNCHRONIZATION INTERVAL ALIGNMENT

[75] Inventor: Nobuyasu Omori, Nagaokakyo, Japan

[73] Assignee: Mitsubishi Denki Kabushiki Kaisha, Tokyo, Japan

[21] Appl. No.: 679,921

[22] Filed: Dec. 10, 1984

[30] Foreign Application Priority Data

Feb. 2, 1984 [JP] Japan .................................. 59-18561

[51] Int. Cl.4 ............................................. H04N 9/80
[52] U.S. Cl. .................... 358/328; 358/330; 358/340
[58] Field of Search ............. 358/310, 327, 328, 330, 358/335, 340, 342

[56] References Cited

U.S. PATENT DOCUMENTS

| | | | |
|---|---|---|---|
| 3,796,825 | 3/1974 | Redlich et al. ....................... | 358/342 |
| 3,963,860 | 6/1976 | Burrus ................................ | 358/342 X |
| 4,233,621 | 11/1980 | Yamagiwa et al. . | |
| 4,419,698 | 12/1983 | Shiraishi et al. ................... | 358/328 X |
| 4,425,584 | 1/1984 | Hirota et al. ....................... | 358/328 |

FOREIGN PATENT DOCUMENTS

| | | |
|---|---|---|
| 0024869 | 3/1981 | European Pat. Off. . |
| 0037230 | 10/1981 | European Pat. Off. . |
| 0041868 | 12/1981 | European Pat. Off. . |
| 0104068 | 3/1984 | European Pat. Off. ............ 358/310 |
| 3111298 | 4/1982 | Fed. Rep. of Germany . |
| 3302211 | 7/1984 | Fed. Rep. of Germany . |

OTHER PUBLICATIONS

"Video Signal Process of 4-Hour VHS VTR" by Hiroshi Taniguchi, National Technical Report, vol. 25, No. 1, Feb. 1979, pp. 70-81.

*Primary Examiner*—Alan Faber
*Assistant Examiner*—W. R. Young
*Attorney, Agent, or Firm*—Lowe, Price, Leblanc, Becker & Shur

[57] ABSTRACT

A magnetic video recorder/reproducer includes a modulation circuit (2) for modulating video signals to be of high frequencies. The modulated video signals are supplied to a 0.25H delay circuit (4) and a 0.5H delay circuit (6) by selection switches (31, 32, 51, 52) which are successively switched in synchronization with head switching pulses in a long recording mode, so that the video signals are delayed with delay amounts cycled in four fields as 0 H→0.25 H→0.5 H→0.75 H→0 H. The delayed video signals are demodulated by a demodulation circuit (7) to return to the original frequencies, to be processed in aluminance signal recording processing circuit (8) and a color signal recording processing circuit (9), and the processed signal components are added up in an adder circuit (10). The added-up video signals are amplified by a recording amplifier (11) and supplied to a video head to be recorded in a magnetic tape, whereby H-alignment is achieved.

17 Claims, 8 Drawing Sheets

$d_H=1.5$ $d_H=0.75$

MAGNETIC VIDEO RECORDING SYSTEM AND METHOD WITH HORIZONTAL SYNCHRONIZATION INTERVAL ALIGNMENT

BACKGROUND OF THE INVENTION

1. Field of the Invention

The present invention relates to a magnetic video recording system. More specifically, it relates to a magnetic video recording system in which H-alignment of video tracks is electrically achieved on the pattern of a magnetic tape when recording is processed in a magnetic video recorder/reproducer.

2. Description of the Prior Art

In general, a magnetic video recorder/reproducer, such as a video cassette recorder, is designed so that high-density recording is possible using a magnetic tape ½ inch wide and 20 μm thick. In the VHS system a tape 240 m in length would be capable of recording for two hours in a NTSC video cassette recorder while a tape 337 m in length would be capable of recording for four hours using a PAL or SECAM video cassette recorder by employing an azimuth recording system and a color signal PS recording system. Further developments have resulted in a video cassette recorder in which the tape speed is reduced by ½ (1.67 cm/sec in the NTSC system, 1.17 cm/sec in the PAL or SECAM system), increasing recording time to four hours (in the NTSC video cassette recorder) at the maximum, with two speed selectivity of two hours and four hours in the NTSC video cassette recorder, four hours and eight hours in the PAL or SECAM video cassette recorder.

Such a four-hour recording video cassette recorder is well known by a report by Hiroshi Taniguchi entitled "Signal Processing in a Four-Hour Recording VHS System VTR." (National Technical Report Vol. 25, No. 1, issued February 1979).

FIG. 1 is an illustration showing an example of a guardbandless magnetic tape recording pattern ($\alpha_H = 1.5$) in a conventional magnetic video recorder/reproducer of a helical scanning system, and FIG. 2 is an illustration showing an example of a tape pattern ($\alpha_H = 0.75$) with tape speed being reduced to ½, whereby "H-alignment" cannot be effectuated.

It is to be noted that symbol $\alpha_H$ represents displacement between adjacent video tracks caused when a video head starts recording (or reproduction) in the lower end of the magnetic tape on the magnetic recording pattern of the same, and the equation $\alpha_H = 1.5$ expresses that the displacement $\alpha_H$ is 1.5 times as long as the horizontal scanning interval H of video signals. Further, the term "H-alignment" indicates that horizontal synchronizing signals on adjacent recording tracks are aligned with each other.

In a conventional video cassette recorder, a magnetization pattern without guard bonds is recorded on a magnetic tape employing a general helical scanning system. The resultant tape pattern is in so-called "H-alignment" in which horizontal intervals between adjacent video tracks are aligned with each other, with the value $\alpha_H$ being equal to 1.5. Such a state is hereinafter referred to as an SP mode.

In this case, long duration recording operation is effected by reducing the tape speed by ½ and thus extending the recording time by a factor of two. Such a state is hereinafter referred to as an LP mode. The tape pattern in this mode is shown in FIG. 2, in which "H-alignment" is not effectuated. Although the relative speed of the video head and video track angles are slightly different in the LP mode than in the SP mode, such slight differences can be disregarded on the tape pattern. The difference between the LP mode and the SP mode can be regarded as residing only in the change in the tape travelling speed. In this case, however, the value $\alpha_H$ is in direct proportion to the tape travelling speed, and the value $\alpha_H$ in the LP mode is ½ of the value $\alpha_H (=1.5)$ in the SP mode, i.e., 0.75 and "H-alignment" cannot be effectuated.

Frequency-modulated (FM) luminance signals are written in the video tracks which are not in "H-alignment", resulting in crosstalk FM components from adjacent tracks being introduced when the subject signals are read by the video head, the heads which are having gap widths generally set to be larger than the track width. Further, since the frequency difference between tracks is large where no "H-alignment" is effectuated, disturbance components called "crosstalk beat components" appearing in demodulated signals are increased due to the character of "delta noise" in the FM waves, leading to deterioration of the quality of the reproduced pictures. In general, such disturbance is visually reduced on a monitor screen by making recording in "½ $f_H$ carrier interleave" system.

In case of a SECAM system, color signals are converted to a low range frequency in a count-down or beat-down manner, to be superposed with the luminance signals and written in the video tracks. However, since the SECAM system uses FM signals, the color picture quality is diminished in a similar manner to that in the case of the FM luminance signals, or is further lowered in comparison with that in the case of the FM luminance signals due to reduced azimuthal loss in the low frequency range. Solution of such problems has resided in an increase of the video head width, sufficient to reduce the pick-up amount of the crosstalk components.

With respect to color signals in systems other than the SECAM system, i.e., in an NTSC system and a PAL system, lack of "H-alignment" does not lead to as significant problems as with FM signals, since the crosstalk beat components are reduced by processes such as color rotation utilizing line correlation instead of field correlation. However disturbance components might still appear on the monitor screen where there are high amplitude color signal levels in tracks adjacent to the main track.

However, when the width of the video track is sufficiently narrowed so as to provide a guard band, the signal-to-noise ratio might be lowered in normal reproducing operation. This may result in noise bands appearing on the monitor screen when reproduction is effected at special speed in operation such as still picture reproduction.

Further, when the special speed reproducing operation such as still picture reproduction and fast forward reproduction is made by the recording tape pattern in which no "H-alignment" is effectuated by changing the tape travelling speed, so-called skew jumps in result. Therein intervals of synchronizing signals are rendered discontinuous when the video head is shifted from one video track to the adjacent video track, which must be corrected by performing specific signal processing during reproduction.

SUMMARY OF THE INVENTION

Accordingly, a primary object of the present invention is to provide a magnetic video recording system in which "H-alignment" on a magnetic tape pattern is effectuated by processing of recording signals, thereby solving problems caused by non-effectuation of "H-alignment".

In the present invention H-alignment is effectuated by utilizing delay elements in a recording signal processing system when horizontal intervals between adjacent video tracks on the tape pattern are not aligned with each other, i.e., not in the subject H-alignment due to restriction in the tape travelling speed, the tape width and the width of the video head.

Thus, according to the present invention, delay elements are so provided that H-alignment is effectuated on the magnetic tape pattern in a recording mode, thereby eliminating crosstalk beats, removal of which cannot be accomplished by corrections possible during the reproducing operation alone. This results in an improvement in the signal-to-noise ratio of the picture quality, and further allows the omission of a skew correction circuit from the reproducing system for special speed reproducing operation.

In a second aspect of the invention, input video signals are delayed by a first delay means so as to output the video signals from the first switching means in response to a first switching signal generated from the switching signal generation means. The signals are delayed by a second delay means so as to output the signals from the first switching means or the signals delayed by the second delay means in response to a second switching signal. The signals are then supplied to a luminance signal processing means and a color signal processing means, in which luminance signal components and color signal components are summed by an adder circuit.

In another embodiment, first and second switching means are so switched in long recording operation that the first and second delay means are selected to delay the input video signals with delay amounts cycled as $0H \to 0.25H \to 0.5H \to 0.75H \to 0H \ldots$.

In still another embodiment, input video signals are superimposed onto a relatively high frequency carrier by a modulation means and are then delayed by a first delay means. The signals outputted from the second switching means are supplied to a demodulation means to be translated back to the video signals of the initial frequencies.

In a still another embodiment, a third means provides 1H signal a delay. A third switching means selects between the output signals from the third delay means and the output from the second switching means. Thus, H-alignment also can be effectuated in a SECAM or PAL system magnetic video recorder/reproducer by providing such third delay means 1H.

In a third aspect of the invention, input video signals are delayed by first delay means, thereby to output the input video signals or the signals delayed by the first delay means from first switching means in response to a first switching signal, and the outputted signals are delayed by second delay means thereby to output the signals outputted from the first switching means or the signals delayed by the second delay means in response to a second switching signal, which outputted signals are delayed by third delay means thereby to output the signals outputted from the second switching means or the signals delayed by the third delay means from third switching means in response to third switching signal to be supplied to color signal processing means, in which color signal components are processed. The input video signals are simultaneously supplied to a luminance signal processing means, and the processed signals are delayed by a fourth delay means. Either the delayed or undelayed signals are selectable by and from fourth switching means in response to the first switching signal, which outputted signals are delayed by fifth delay means thereby to switch and output the signals outputted from the fourth switching means or the signals delayed by the fifth delay means in response to the second switching signal, which outputted signals are added up with the output signals from the color signal processing means.

In another embodiment, the first, second and third switching means are so successively switched in long recording operation that signal delays are cycled in eight fields as $0H \to 1.25H \to 0.5H \to 1.75H \to 1.0H \to 0.25H \to 1.5H \to 0.75H \to 0H \ldots$ by the first, second and third delay means, while the fourth and fifth switching means are so switched that delay of the signals outputted from the luminance signal processing means are cycled in four fields as $0H \to 0.25H \to 0.5H \to 0.75H \to 0H \ldots$ by the fourth and fifth delay means.

The above and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
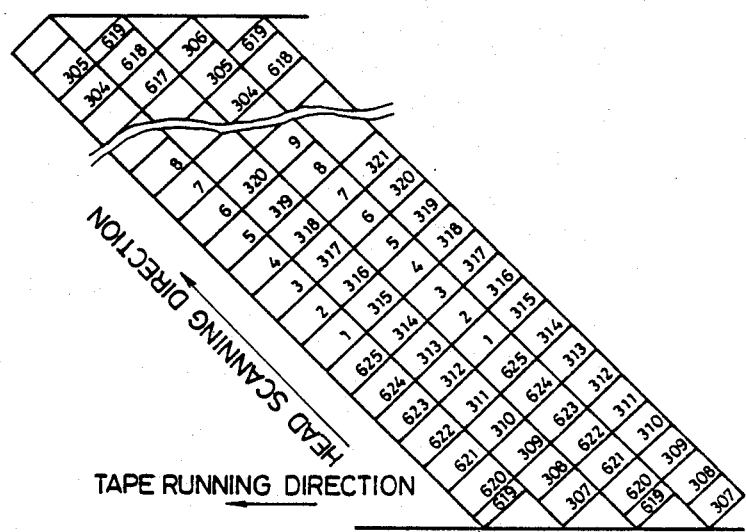
FIG. 1 is an illustration showing a recording pattern of a magnetic tape with no guard bands in which video signals are recorded in a helical scanning system.
Figure 2:
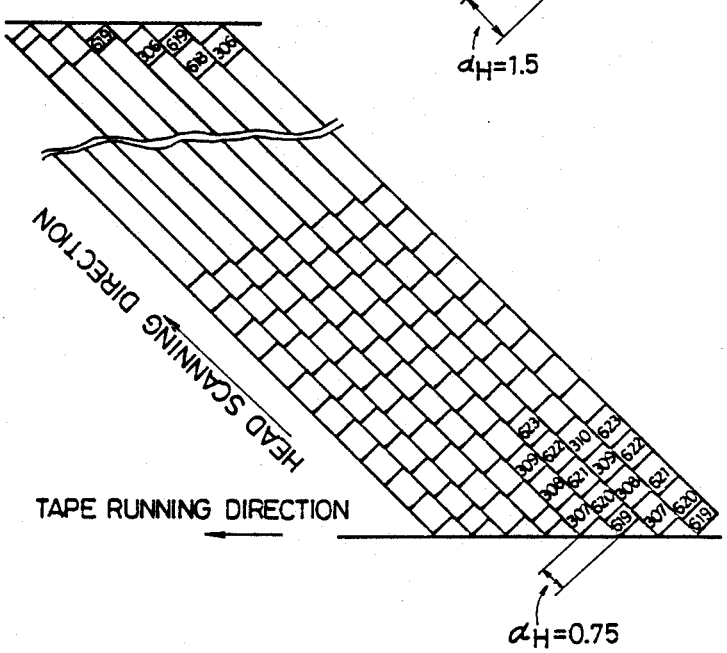
FIG. 2 is an illustration showing an example of a tape pattern in which H-alignment is not effectuated with the tape traveling speed being reduced to ½.
Figure 3:
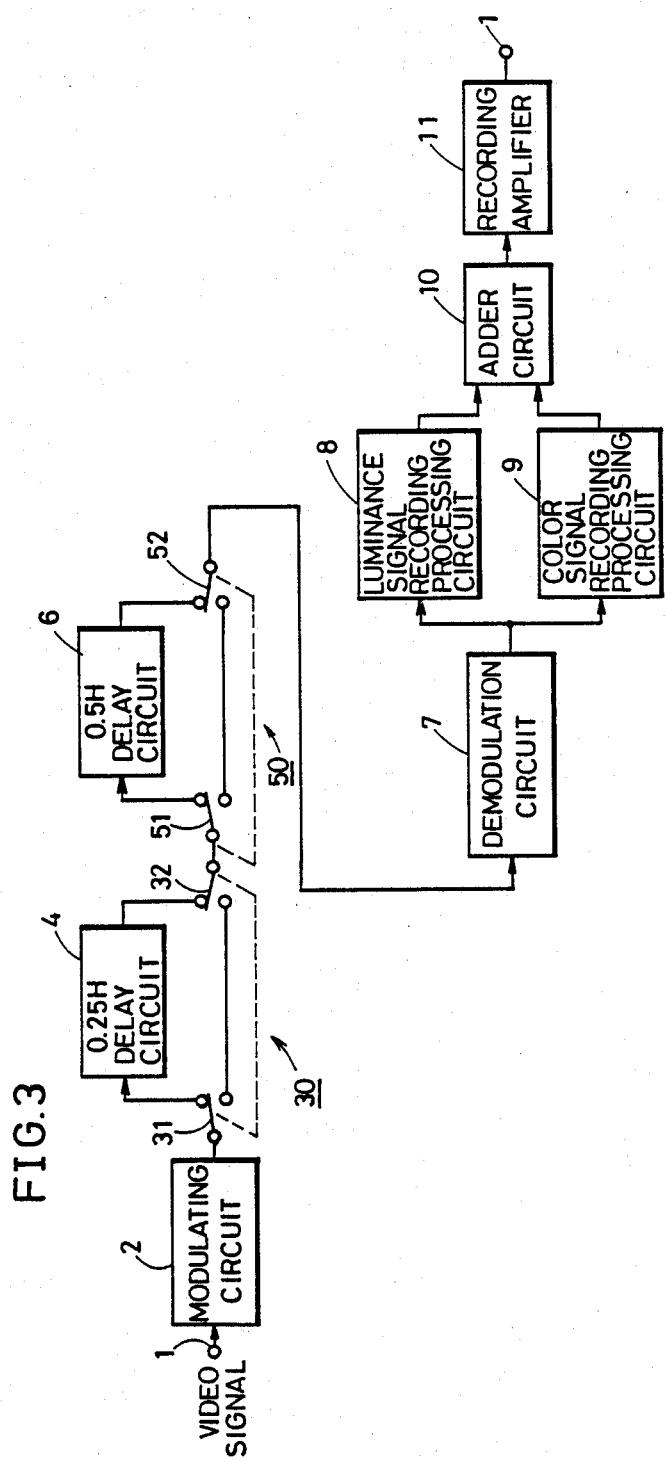
FIG. 3 is a block diagram showing an example of a correction circuit in a magnetic video recorder/reproducer of an NTSC system to which the present invention is applied.
Figure 4:
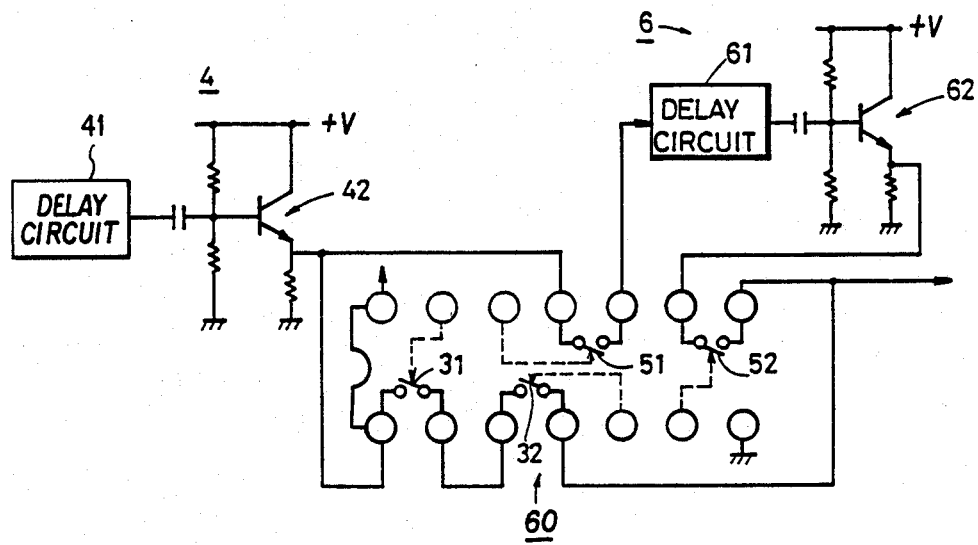
FIG. 4 is an electric circuit diagram showing examples of selection switches as shown in FIG. 3.
Figure 5:
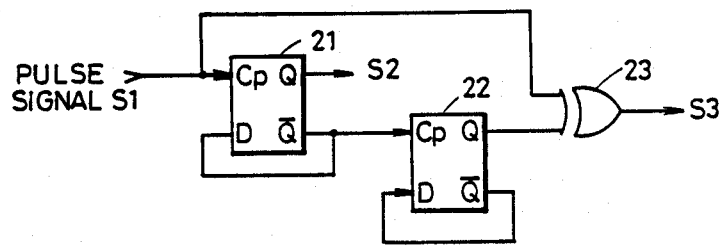
FIG. 5 is a block diagram showing a switching signal generation circuit.
Figure 6:
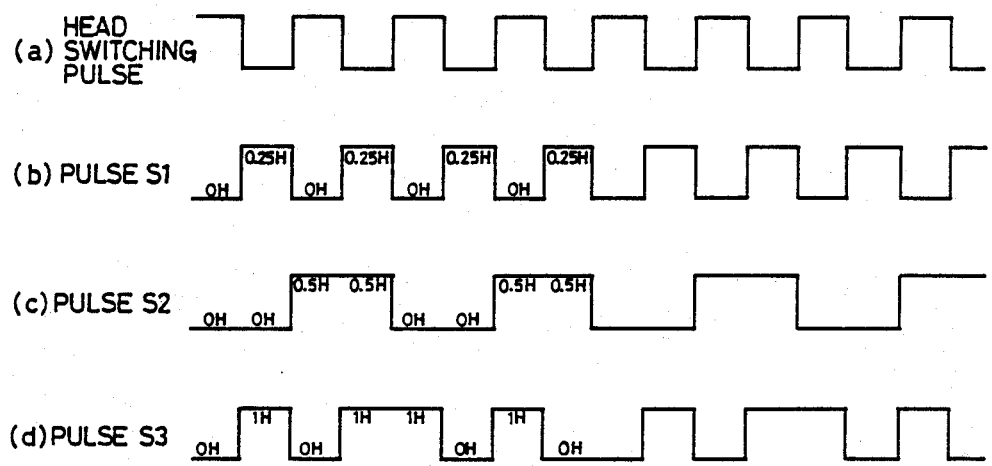
FIG. 6, (a)-(d), is a waveform diagram showing a head switching pulse and switching signals for selection switches produced from the pulse.

FIG. 3 is a block diagram showing electrical structure of an embodiment of the present invention. FIG. 4 is a circuit diagram of examples of selection switches as shown in FIG. 3, while FIG. 5 is a block diagram of a switching signal generation circuit for generating signals for switching the selection switches. FIG. 6 is a waveform diagram showing a head switching pulse and a switching signals for the selection switches produced from the head switching pulse.

The block diagram as shown in FIG. 3 is illustrative of only a recording system in a magnetic video recorder/reproducer, which is applied to an NTSC system video cassette recorder. In FIG. 3, an input terminal 1 receives video signals, which are then supplied to a modulation circuit 2. The modulation circuit 2 impresses the video signals onto a high frequency carrier for passing a 0.25H delay circuit 4 and a 0.5H delay circuit 6 as hereinafter described. The output end of the modulation circuit 2 is connected to a first input end of a selection switch 31 which functions as a first switch means. A first output end of the selection switch 31 is connected to an input end of the 0.25H delay circuit 4, while a second output end thereof is connected to a second input end of a selection switch 32 which functions as a second switch means. A first input end of the second selection switch 32 is connected to the output end of the 0.25H delay circuit 4. The second selection switch 32 forms first switching means 30 with the first selection switch 31, and the two selection switches 31 and 32 operate in an interlocking manner based on a first switching signal S1 generated from a switching signal generation circuit 20 shown in FIG. 5 as hereinafter described.

A first output end of the selection switch 32 is connected to a first input end of a selection switch 51 which functions as a third switch means. A first output end of the selection switch 51 is connected to an input end of the 0.5H delay circuit 6 which functions as a second delay means, while a second output end of the selection switch 51 is connected to a second input end of a selection switch 52 which functions as a fourth switch means. A first input end of the selection switch 52 is connected with the output end of the 0.5H delay circuit 6. The third and fourth selection switches 51 and 52 form second switching means 50, and operate in an interlocking manner based on a second switching signal S2 generated from the switching signal generation circuit 20.

A first output end of the selection switch 52 is connected to an input end of a demodulation circuit 7. The demodulation circuit 7 is adapted to demodulate the video signals which have been modulated to high frequencies to those of the initial frequencies. The output end of the demodulation circuit 7 is connected to respective input ends of a luminance signal recording processing circuit 8 and a color signal recording processing circuit 9. The luminance signal recording processing circuit 8 is adapted to process luminance signal components of the video signals, while the color signal recording processing circuit 9 is adapted to process color signal components included in the video signals. Respective output ends of the luminance signal recording processing circuit 8 and the color signal recording processing circuit 9 are connected to an input end of an adder circuit 10, in which the output signals therefrom are summed. An output end of the adder circuit 10 is connected to an input end of a recording amplifier 11, in which the summed signals are amplified and supplied through an output terminal 12 to a video head (not shown), thereby recorded in a magnetic tape.

The 0.25H delay circuit 4 and the 0.5H delay circuit 6 may be formed by CCDs, glass delay lines or shift registers respectively. When, for example, the 0.5H delay circuit 6 is formed by a 455 stage shift register, a signal delay of 0.5H can be obtained using a clock signal frequency of 14.3 MHz. When glass delay lines are used as the delay circuits 4 and 6, it is necessary to temporarily modulate the video signals onto a high frequency carrier by modulation circuit 2 and then to reconvert the delayed signal using demodulation circuit 7, the glass delay lines not being able to pass direct current and low frequency components (generally lower than 1 to 2 MHz). However, when the delay circuits 4 and 6 are formed by, e.g., CCDs which can pass direct current components, it is not necessary to provide the modulation circuit 2 and the demodulation circuit 7.

Further, the aforementioned selection switches 31, 32, 51 and 52 can be formed by any kind of switches such as an IC analog switches, relay switches and transistor switching circuits which can pass or cut off the desired signals. When, for example, IC analog switches are to be employed, the switches may be formed by buffer amplifiers 42 and 62 comprising transistor emitter-follower circuits and an IC analog switch 60 as shown in FIG. 4. In the circuit diagram illustrated in FIG. 4, there are shown the selection switches 31, 32, 51 and 52 provided on input/output sides of the delay circuits 4 and 6. As hereinabove described, the switching signals S1 and S2 for respectively switching the selection switches 31, 32, 51 and 52 are generated from the switching signal generation circuit 20 as shown in FIG. 5.

The switching signal generation circuit 20 is formed by two flip-flops 21 and 22 and an EXOR gate 23 as shown in FIG. 5. The flip-flop 21 is clocked by pulse signal S1 (see FIG. 6(b)) obtained by inverting a head switching pulse as shown in FIG. 6(a) by an inverter (not shown). The pulse signal S1 is supplied to the selection switches 31 and 32 as the first switching signal. The flip-flop 21 performs ½ frequency division of the pulse signal S1, supplying pulse signal S2 as shown in FIG. 6(c) to the selection switches 51 and 52 as the second switching signal from its Q output terminal. The $\bar{Q}$ output of the flip-flop 21 is supplied to a clock pulse input end of the flip-flop 22. The flip-flop 22 performs ½ frequency division of the $\bar{Q}$ output from the flip-flop 21, to supply the same to one input end of the EXOR gate 23. The other input end of the EXOR gate 23 is supplied with the pulse signal S1. Therefore, the EXOR gate 23 outputs a pulse signal S3 as shown in FIG. 6(d). The pulse signal S3 functions as a third switching signal as hereinafter described.

Figure 7:
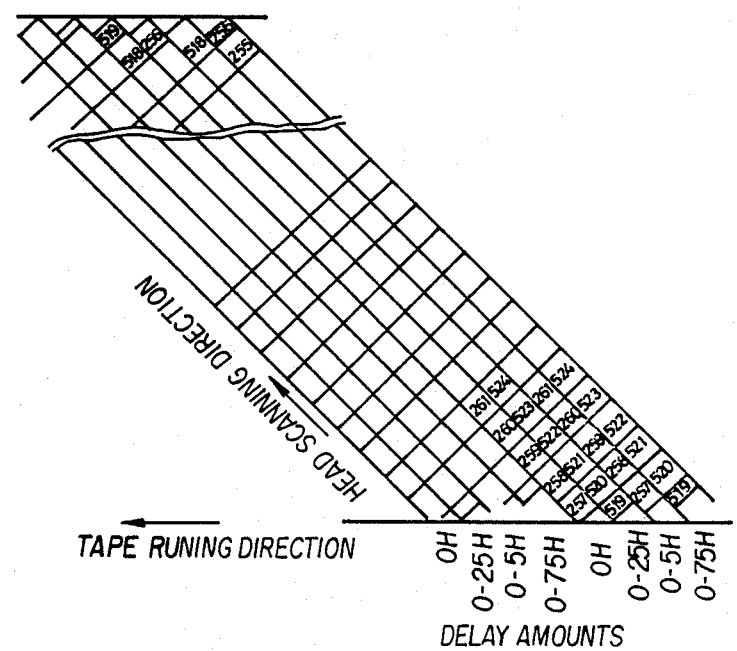
FIG. 7 is an illustration showing a tape recording pattern after correction by the embodiment as shown in FIG. 3.

FIG. 7 is illustrative of a recording pattern on the tape after correction by the embodiment as shown in FIG. 3.

Referring now to FIGS. 3 to 7, operation of the embodiment of the present invention is described. The video signals are inputted through the input terminal 1 in the modulation circuit 2, to be modulated onto a high frequency carrier signal. The modulated video signals are delayed by the 0.25H delay circuit 4 and the 0.5H delay circuit 6 by switching of the selection switches 31, 32, 51 and 52. In this case, the selection switches 31, 32, 51 and 52 are switched in synchronization with the head switching pulse as shown in FIG. 6(a). In other words, when a first head switching pulse is inputted in the switching signal generation circuit 20, the selection switches 31 and 51 are switched to the second output ends and the selection switches 32 and 52 are switched to the second input ends respectively by the pulse signals S1 and S2. Therefore, the output from the modulation circuit 2 bypasses the 0.25H delay circuit 4 and the 0.5H delay circuit 6, and is supplied to the demodulation circuit 7 through the selection switches 31, 32, 51 and 52.

When the subsequent head switching pulse is inputted in the switching signal generation circuit 20, the selection switch 31 is switched to the first output end and the selection switch 32 is switched to the first input end by the pulse signal S1. Thus, the output from the modulation circuit 2 is inputted through the selection switch 31 in the 0.25H delay circuit 4, to be delayed by 0.25H and inputted in the demodulation circuit 7 through the selection switches 32, 51 and 52.

Upon inputting of a further head switching pulse in the switching signal generation circuit 20, the selection switch 31 is switched to the second output end and the selection switch 32 is switched to the second input end by the pulse signal S1. Further, the selection switch 51 is switched to the first output end and the selection switch 52 is switched to the first input end by the pulse signal S2 from the switching signal generation circuit 20. Thus, the output from the modulation circuit 2 is delayed by 0.5H by the 0.5H delay circuit 6 to be inputted in the demodulation circuit 7. When a further subsequent head switching pulse is inputted in the switching signal generation circuit 20, the selection switch 31 is switched to the first output end and the second selection switch 32 is switched to the first input end by the pulse signal S1. Thus, the output from the modulation circuit 2 is delayed by 0.75H by the 0.25H delay circuit 4 and the 0.5H delay circuit 6.

Thus, the delay amounts are switched, by successive switching of the selection switches 31, 32, 51 and 52 by the pulse signals S1 and S2 synchronized with the head switching pulses, in the cycle of four fields as follows:

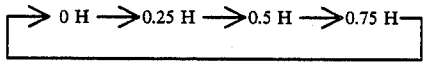

By the aforementioned successive switching of the delay amounts, the recording pattern on the tape is brought to a state as shown in FIG. 7, whereby "H-alignment" is effectuated. Therefore, crosstalk components from the adjacent tracks mixed into the FM luminance signals by field correlation and line correlation of the signals are rendered zero beat with respect to the main signal components and suppressed after demodulation, resulting in no crosstalk beat appearing in the demodulation circuit 7 output. Further, the width of the video head can be relatively large, with corresponding improvement of the signal-to-noise ratio. In addition, no skew jump correction circuit is required in special speed reproducing operation, such as still picture reproduction and fast forward reproduction, to obtain excellent picture quality.

Figure 8:
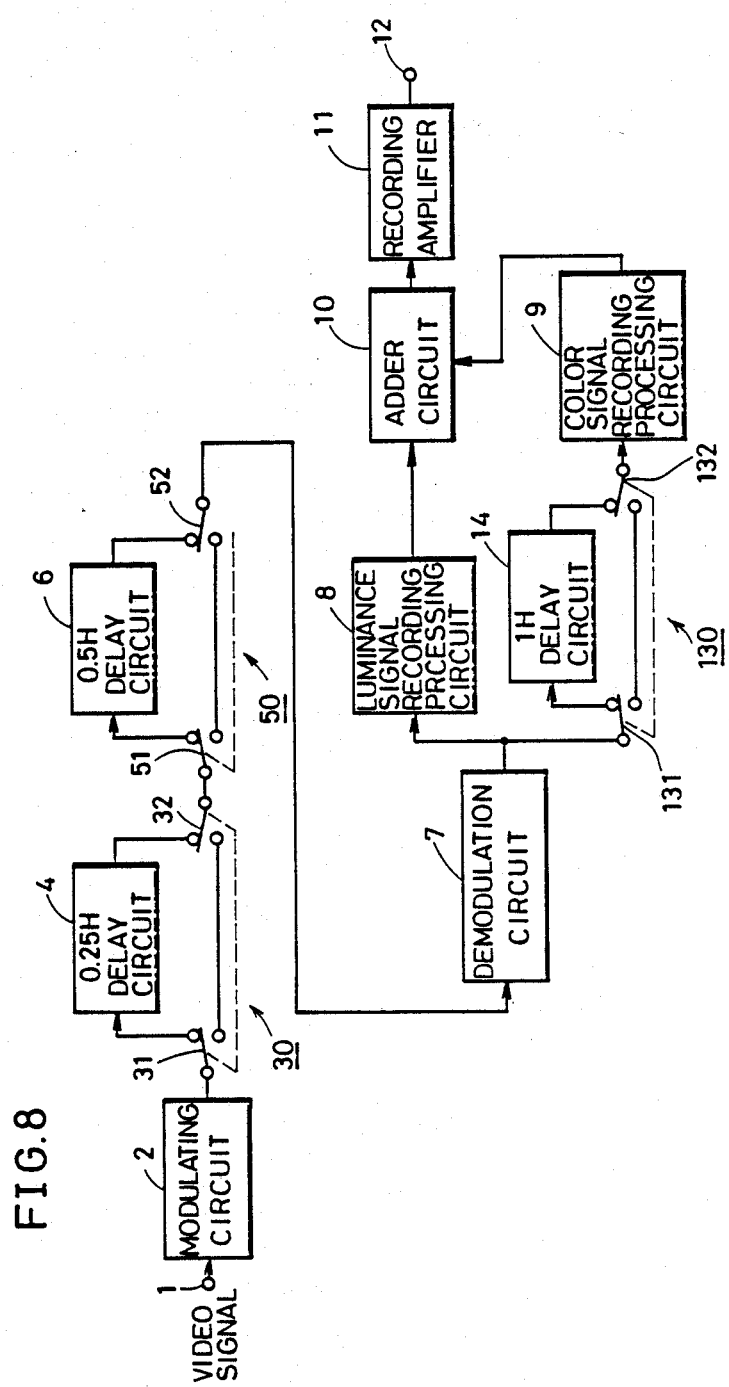
FIG. 8 is a block diagram showing an example of a correction circuit in a magnetic video recorder/reproducer employing a PAL system and a SECAM system according to another embodiment of the present invention.
Figure 9:
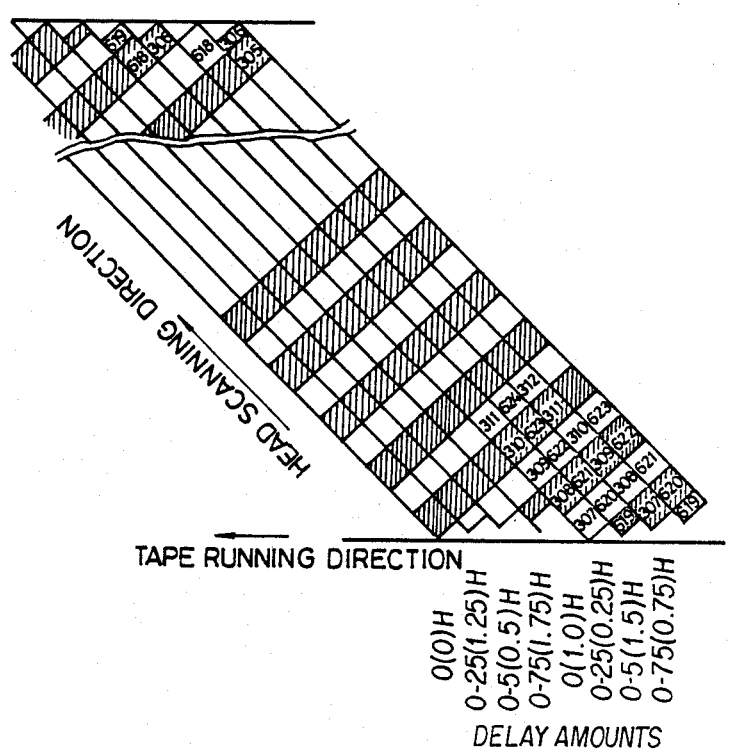
FIG. 9 is an illustration showing a tape recording pattern after correction by the embodiment as shown in FIG. 8.

FIG. 8 is a block diagram showing a recording system of a magnetic video recorder/reproducer according to the present invention and employing the PAL system and the SECAM system, and FIG. 9 is an illustration showing a recording pattern of the tape after correction by the embodiment as shown in FIG. 8.

The embodiment as shown in FIG. 8 is identical to that shown in FIG. 3, except for the following components: On the input side of a color signal processing circuit 9, there are provided a 1H delay circuit 14 which functions as a third delay means and third switching means 130 for switching the 1H delay circuit 14. The third switching means 130 is formed by a selection switch 131 which functions as a fifth switch means and a selection switch 132 which functions as a sixth switch means. A first input end of the selection switch 131 is connected to an output end of a demodulation circuit 7, while a first output end thereof is connected to an input end of the 1H delay circuit 14 and a second output end thereof is connected to a second input end of the selection switch 132. A first input end of the selection switch 132 is connected to the output end of the 1H delay circuit 14, while the first output end thereof is connected to the input end of the color signal recording processing circuit 9. The selection switches 131 and 132 are switched by a pulse signal S3 which is generated from a switching signal generation circuit 20 as a third switching signal.

Therefore, with respect to the video signals inputted in a luminance signal recording processing circuit 8, delay scanning is effected such that delay amounts thereof are cycled in four fields as follows:

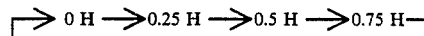

On the other hand, the video signals inputted in the color signal recording processing circuit 9 are subjected to delay scanning such that the delay amounts thereof are cycled in eight fields as follows:

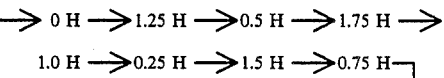

Further description of the above is hereafter made.

With respect to color signals of the PAL system and the SECAM system, color signals of the same kind appear every 2-H period. That is, color-burst signals in phases of +135° and −135° alternately appear every 1-H period in the PAL system, while R-Y color signals and B-Y color signals alternately appear every 1-H period in the SECAM system. Therefore, in the subject systems, correction similar to that in the NTSC system as hereinabove described with reference to FIG. 3 is performed to effectuate "H-alignment" in the luminance signals, and the color signals of the same kind are corrected by the 1H delay circuit 14 and the selection switches 131 and 132 so that "H-alignment" is effectuated. Thus, the magnetization pattern recorded in the magnetic tape upon correction processing of the video signals is brought to the state as shown in FIG. 9, in which correlated signals including the color signals are in alignment with each other, whereby the aforementioned problems of deterioration in picture quality caused by insufficient H-alignment are entirely solved.

Although the luminance signals and the color signals are simultaneously subjected to delay scanning in the embodiment as shown in FIG. 8, these signals may be separately subjected to delay scanning. Description is now made of an embodiment in which the subject signals are separately delayed.

Figure 10:
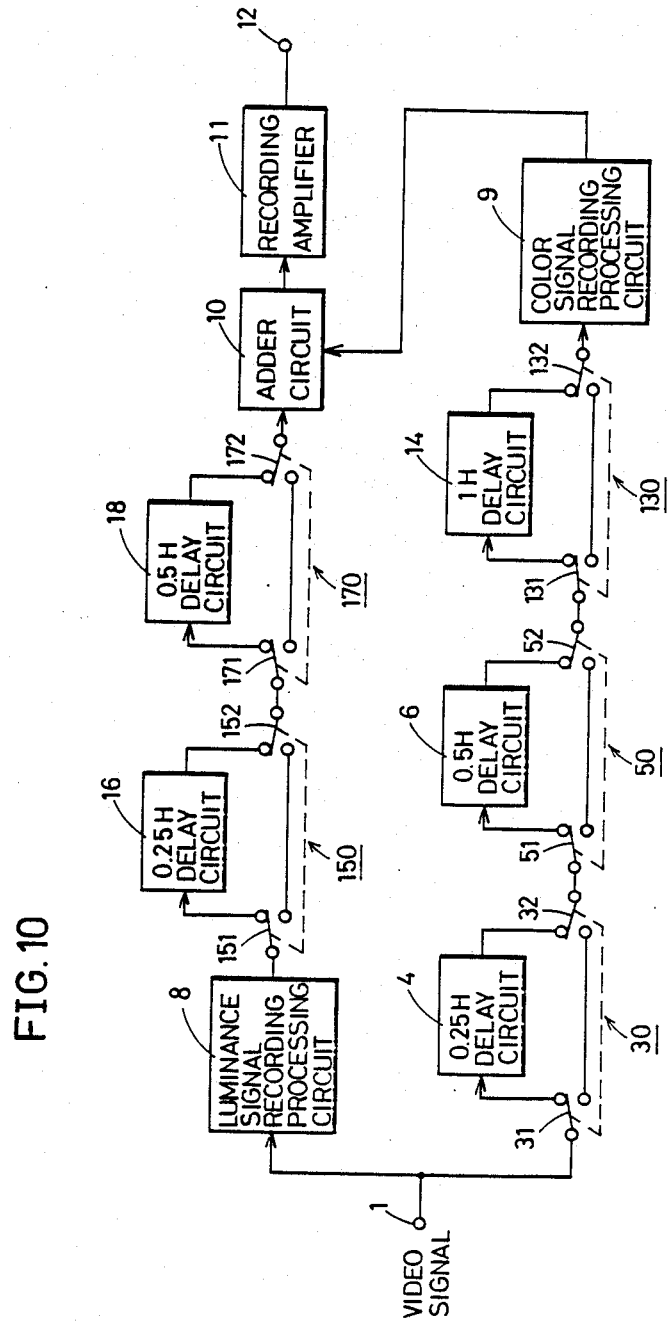
FIG. 10 is a block diagram showing still another embodiment of the present invention.

FIG. 10 is a block diagram showing still another embodiment of the present invention. In FIG. 10, selection switches 31, 32, 151 and 152 are switched by the pulse signal S1 as shown in FIG. 6(b) and selection switches 51, 52, 171 and 172 are switched by the pulse signal S2 as shown in FIG. 6(c), while selection switches 131 and 132 are switched by the pulse signal S3 as shown in FIG. 6(d). In such structure, video signals inputted in an input terminal 1 are supplied to a luminance signal recording processing circuit 8. With respect to the processed luminance signal components, a 0.25H delay circuit 16 which functions as a fourth delay means and a 0.5H delay circuit 18 which functions as a fifth delay means are successively selected by fourth switching means 150 formed by the selection switch 151 which functions as a seventh switch means and the selection switch 152 which functions as eighth switch means and fifth switching means 160 formed by the selection switch 171 which functions as a ninth switch means and the selection switch 172 which functions as a tenth switch means. Thus, the luminance signals are subjected to delay scanning in the aforementioned order of 0H→0.25H→0.5H→0.75H→0H, to be supplied to an adder circuit 10.

With respect to color signal components included in the video signals, a 0.25H delay circuit 4, a 0.5H delay circuit 6 and a 1H delay circuit 14 are successively selected by the selection switches 31, 32, 51, 52, 131 and 132, so that the color signals included in the video signals are subjected to delay scanning in the aforementioned order of 0H→1.25H→0.5H→1.75H→1.0H→0.25H→1.5H→0.75H→0H, to be supplied to a color signal recording processing circuit 9. The color signal components processed in the color signal recording processing circuit 9 are summed with the luminance signal components by adder circuit 10 and outputted through a recording amplifier 11 at an output terminal 12, to be recorded on a magnetic tape by a video head.

Thus, in the embodiment shown in FIG. 10, the magnetization pattern produced on the magnetic tape is, as shown in FIG. 9, similar to the embodiment as shown in FIG. 8, in which correlated signals including the color signals are aligned with each other.

Figure 11:
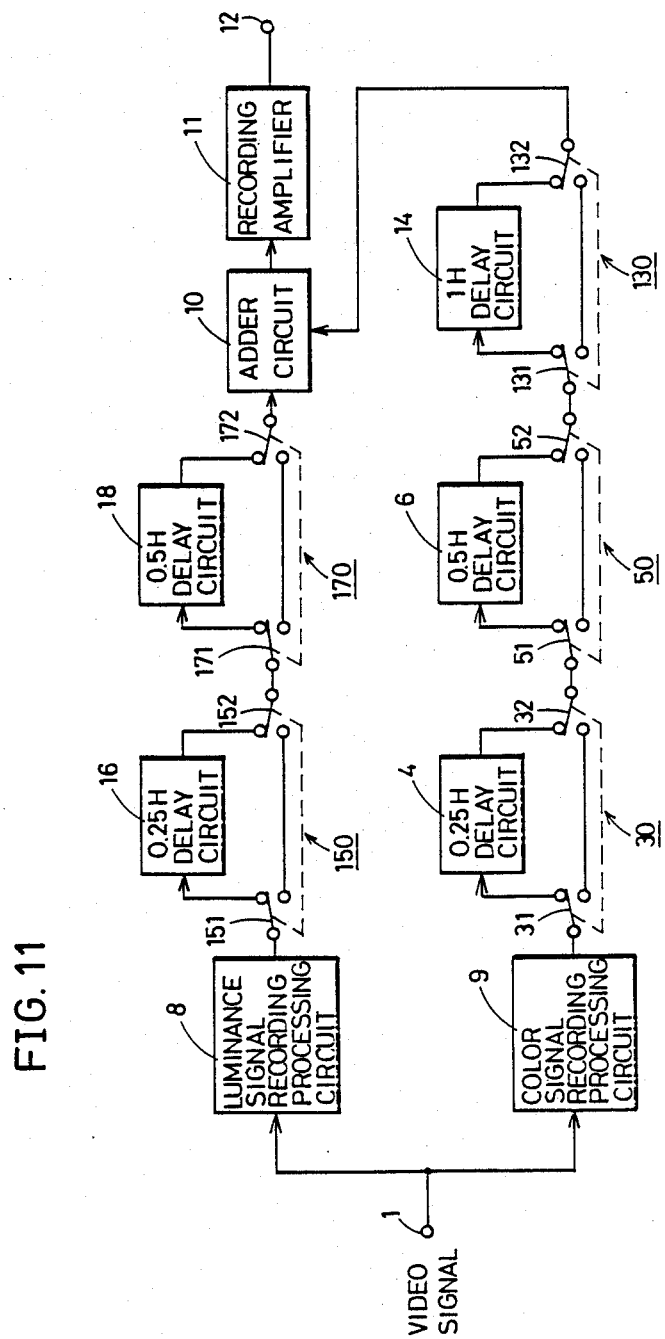
FIG. 11 is a block diagram showing a further embodiment of the present invention.

FIG. 11 is a block diagram showing a further embodiment of the present invention. In the embodiment as shown in FIG. 11, the color signal recording processing circuit 9 according to the aforementioned embodiment shown in FIG. 10 is connected to an input side of a selection switch 31 so that color signal components included in video signals are processed in the color signal recording processing circuit 9, to be subjected to delay scanning successively by a 0.25H delay circuit 4, a 0.5H delay circuit 6 and a 1H delay circuit 14 in a similar manner to the embodiment as shown in FIG. 10. Also in the present embodiment, a magnetization pattern recorded in a magnetic tape is brought in the state as shown in FIG. 9 similarly to the embodiment as shown in FIG. 8.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic video recorder having a recording means for recording a video signal on a recording medium and switchable between a standard time recording mode and a long recording mode, said recording means including:

switching signal generation means for generating first and second switching signals;

first delay means receiving video signals in its input end for delaying said video signals;

first switching means receiving said input video signals in said input end of said first delay means and video signals delayed by said first delay means for performing a first switching operation in response to said first switching signal generated from said switching signal generation means for outputting said input video signals or said signals delayed by said first delay means;

second delay means receiving output signals from said first switching means in its input end for delaying said signals outputted from said first switching means;

second switching means receiving said output signals from said first switching means and output signals from said second delay means for performing a second switching operation in response to said second switching signal generated from said switching signal generation means and outputting said output signals from said first switching means or said signals delayed by said second delay means;

luminance signal processing means receiving said output signals from said second switching means in its input end for processing liminance signal components of said video signals outputted from said second switching means;

color signal processing means receiving said output signals from said second switching means in its input end for processing color signal components of said video signals outputted from said second switching means;

adder means for adding up said luminance signal components processed by said luminance signal processing means and said color signal components processed by said color signal processing means, and means responsive to said adder means for recording said video signal on a recording medium.

2. A magnetic video recorder in accordance with claim 1, wherein said first delay means includes means for delaying inputted signals based on a delay amount of either 0.25H or 0.5H, and said second delay means includes means for delaying inputted signals based on the other one of said delay amounts of 0.25H and 0.5H.

3. A magnetic video recorder in accordance with claim 2, wherein said switching signal generation means includes means for generating signals for selecting said first and second delay means so that delay amounts of said video signals to be delayed in said long recording mode are cycled in four fields as 0H→0.25H→4.5H→0.75H→0H ... in said first and second switching signals.

4. A magnetic video recorder in accordance with claim 1, wherein said first switching means includes:
first switch means including a first input end and first and second output ends, said first input end receiving said inputted video signals with said first output end being connected to said input end of said first delay means, for performing said first switching operation in response to said first switching signal from said switching signal generation means and outputting said video signals inputted in said first input end from said first or second output end, and
second switch means including first and second input ends and a first output end, said first input end being connected to an output end of said first delay means with said second input end being connected to said second output end of said first switching means, for performing a switching operation in synchronization with said first switch means in response to said first switching signal, and
said second switching means includes:
third switch means including a first input end and first and second output ends, said first input end being connected to said first output end of said second switch means with said first output end being connected to said input end of said second delay means, for performing said second switching operation in response to said second switching signal generated from said switching signal generation means; and
fourth switch means including first and second input ends and a first output end, said first input end being connected to said output end of said second delay means with said second input end being connected to said second output end of said third switch means, while said first output end is connected to respective input ends of said luminance signal processing means and said color signal processing means.

5. A magnetic video recorder in accordance with claim 4, further including:
modulation means receiving said inputted video signals in its input end with its output end being connected to said first input end of said first switch means for modulating said inputted video signals to signals of relatively high frequencies; and
demodulation means connected between said first output end of said fourth switch means and said respective input ends of said luminance signal processing means and said color signal processing means for returning frequencies of signals outputted form said first output end of said fourth switch means to those of the original video signals.

6. A magnetic video recorder in accordance with claim 1, wherein
said switching signal generation means includes means for generating a third switching signal which is different from said first and second switching signals, and further includes:
third delay means having an input end being connected to said output end of said second switching means, and
third switching means receiving said output signals from said third delay means and said output signals from said second switching means for performing a third switching operation in response to said third switching signal from said switching signal generation means and supplying said output signals from said third delay means or said output signals from said second switching means to said input end of said color signal processing means.

7. A magnetic video recorder in accordance with claim 6, wherein
said third switching means includes:
fifth switch means including a first input end and first and second output ends, said first input end being connected to said output end of said second switching means with said first output end being connected to said input end of said third delay means, for performing said third switching operation in response to said third switching signal; and
sixth switch means including first and second input ends and a first output end, said first input end being connected to said output end of said third delay means with said second input end being connected to said second output end of said fifth switch means, while said first output end is connected to said input end of said color signal processing means.

8. A magnetic video recorder in accordance with claim 7, wherein
said third delay means includes means for delaying signals inputted therein in a delay amount of 1H.

9. A magnetic video recorder in accordance with claim 6, wherein
said switching signal generation means includes means for generating said first and second switching signals so as to supply said luminance signal processing means with said inputted video signals delayed with delay amounts cycled in four fields as 0H→0.25H→0.5H→0.75H→0H . . . as well as supplying said color signal processing means with said inputted video signals delayed with delay amounts cycled in eight fields as 0H→1.25H→0.5H→1.75H→1.0H→0.25H→1.5H-→0.75H→0H . . . in said long recording mode.

10. A magnetic video recorder having a recording means switchable between a standard time recording mode and a long recording mode, said magnetic video recorder including:
switching signal generation means for generating first, second and third switching signals;
first delay means receiving input video signal in its input end for delaying said video signals;
first switching means for receiving said input video signals in said input end of said first delay means and said video signals delayed by said first delay means for performing a first switching operation in response to said first switching signal generated from said switching signal generation means and outputting said input video signals or said video signals delayed by said first delay means;
second delay means receiving said output signals from said first switching means in its input end for delaying said signals outputted from said first switching means;
second switching means receiving said output signals from said first switching means and said output signals from said second delay means for performing a second switching operation in response to said second switching signal generated from said switching signal generation means and outputting said output signals from said first switching means or said signals delayed by said second delay means;
third delay means receiving said output signals from said second switching means in its input end for delaying said signals outputted from said second switching means;

third switching means receiving said output signals from said second switching means and said output signals from said third delay means for performing a third switching operation in response to said third switching signal generated from said switching signal generation means and outputting said output signals from said second switching means or said signals delayed by said third delay means;

color signal processing means receiving said output signals from said third switching means for processing color signal components included in said signals;

luminance signal processing means receiving said input video signals in its input end for processing luminance signal components included in said input video signals;

fourth delay means having an input end being connected with an output end of said luminance signal processing means for delaying said signals processed by said luminance signal processing means;

fourth switching means receiving said output signals from said luminance signal processing means and said output signals from said fourth delay means for performing a fourth switching operation in response to said first switching signal and outputting said output signals from said luminance signal processing means or said output signals from said fourth delay means;

fifth delay means receiving said output signals from said fourth switching means in its input end for delaying said signals outputted from said fourth switching means;

fifth switching means receiving said output signals from said fifth delay means and said output signals from said fourth switching means for performing a fifth switching operation in response to said second switching signal and outputting said output signals from said fifth delay means or said output signals from said fourth switching means; and adder means for adding up said color signal components processed by said color signal processing means and said signal outputted from said fifth switching means, and means responsive to said adder means for recording said video signal on a recording medium.

11. A magnetic video recorder in accordance with claim 10, wherein said first and fourth delay means include means for delaying signals inputted therein based on a delay amount of either 0.25H or 0.5H, said second and fifth delay means include means for delaying signals inputted therein based on the other one of said delay amounts of 0.25H and 0.5H, and said third delay means includes means for delaying signals inputted therein based on a delay amount of 1H.

12. A magnetic video recorder in accordance with claim 11, wherein said switching signal generation means includes means for generating signals for selecting said first, second and third delay means such that delay amounts of video signals to be delayed are cycled in eight fields as 0H→1.25H→0.5H→1.75H→1.0H→0.25H→1.5H→0.75H→0H . . . as said first, second and third switching signals in said long recording mode while generating signals for selecting said fourth and fifth delay means such that delay amounts of said signals outputted from said luminance signal processing means are cycled in four fields as 0H→0.25H→0.5H→0.75H→0H . . . .

13. A magnetic video recorder in accordance with claim 11, wherein said first switching means includes:

first switch means including a first input end and first and second output ends, said first input end receiving said input video signals with said first output end being connected to said input end of said first delay means, for performing said first switching operation in response to said first switching signal from said switching signal generation means and outputting said video signals inputted in said first input end from said first or second output end, and second switch means including first and second input ends and a first output end, said first input end being connected to said output end of said first delay means with said second input end being connected to said second output end of said first switch means, for performing a switching operation in synchronization with said first switch means in response to said first switching signal, said second switching means includes:

third switch mneans including a first input end and first and second output ends, said first input end being connected to said first output end of said first switch means with said first output end being connected to said input end of said second delay means, for performing said second switching operation in response to said second switching signal, and fourth switch means including first and second input ends and a first output end, with said first input end being connected to said output end of said second delay means with said second input end being connected to said second output end of said third switch means, for performing a switching operation in synchronization with said third switch means in response to said second switching signal, said third switching means includes:

fifth switch means including a first input end and first and second output ends, said first input end being connected to said first output end of said fourth switch means with said first output end being connected to said input end of said third delay means, for performing said third switching operation in response to said third switching signal, and sixth switch means including first and second input ends and a first output end, said first input end being connected to said output end of said third delay means with said second input end being connected to said second output end of said fifth switch means and said first output end being connected to said input end of said color signal processing means, for performing a switching operation in synchronization with said fifth switch means in response to said third switching signal, said fourth switching means includes:

seventh switch means including a first input end and first and second output ends, said first input end being connected to said output end of said luminance signal processing means with said first output end being connected to said input end of said fourth delay means, for performing said fourth switching operation in response to said first switching signal, and eighth switch means including first and second input ends and a first output end, said first input end being connected to said output end of said fourth delay means with said second input end being connected to said second output end of said seventh switch means, for performing a switching operation in synchronization with said seventh switch means in response to said first switching signal, and said fifth switching means includes:

ninth switch means including a first input end and first and second output ends, with said first input end being connected to said first output end of said eighth switch means with said first output end being connected to said input end of said fifth delay means, for performing said fifth switching operation in response to said second switching signal, and tenth switch means including first and second input ends and a first output end, said first input end being connected to said output end of said fifth delay means with said second input end being connected to said second output end of said ninth switch means, for performing a switching operation in synchronization with said ninth switch means in response to said second switching signal.

14. A magnetic video recorder having a recording means switchable between a standard time recording mode and a long recording mode, said magnetic video recorder including:

switching signal generation means for generating first, second and third switching signals;

color signal processing means receiving input video signals in its input end for processing color signal components included in said input video signals;

first delay means receiving output signals from said color signal processing means in its input end for delaying said signals;

first switching means for receiving said output signals from said color signal processing means and said signals delayed by said first delay means for performing a first switching operation in response to said first switching signal generated from said switching signal generation means and outputting said output signals from said color signal processing means or said signals delayed by said first delay means;

second delay means receiving said output signals from said first switching means in its output end for delaying said signals outputted from said first switching means;

second switching means receiving said output signals from said first switching means and output signals from said second delay means for performing a second switching operation in response to said second switching signal generated from said switching signal generation means and outputting said output signals from said first switching means or said signals delayed by said second delay means;

third delay means receiving said output signals from said second switching means in its input end for delaying said signals outputted from said second switching means;

third switching means receiving said output signals from said second switching means and output signals from said third delay means for performing a third switching operation in response to said third switching signal generated from said switching signal generation means and outputting said output signals from said second switching means or said signals delayed by said third delay means;

luminance signal processing means receiving said input video signals in its input end for processing luminance signal components included in said input video signals;

fourth delay means having an input end being connected with an output end of said luminance signal processing means for delaying said signals processed by said luminance signal processing means;

fourth switching means receiving output signals from said luminance signal processing means and output signals from said fourth delay means for performing a fourth switching operation in response to said first switching signal and outputting said output signals from said luminance signal processing means or output signals from said fourth delay means;

fifth delay means receiving output signals from said fourth switching means in its input end for delaying said signals outputted from said fourth switching means;

fifth switching means receiving output signals from said fifth delay means and said output signals from said fourth switching means for performing a fifth switching operation in response to said second switching signal and outputting said output signals from said fifth delay means or said output signals from said fourth switching means, adder means for adding up said output signals from said third switching means and output signals from said fifth switching means, and means responsive to said adder means for recording said video signal on a recording medium.

15. A magnetic video recorder in accordance with claim 14, wherein said first and fourth delay means include means for delaying signals inputted therein based on a delay amount of either 0.25H or 0.5H, said second and fifth delay means include means for delaying signals inputted therein based on the other one of said delay amounts of 0.25H and 0.5H, and said third delay means includes means for delaying signals inputted therein based on a delay amount of 1H.

16. A magnetic video recorder in accordance with claim 14, wherein said switching signal generation means includes means for generating signals for selecting said first, second and third delay means so that delay amounts of video signals to be delayed are cycled in eight fields as 0H→1.25H→0.5H→1.75H→1.0H→0.25H→1.5H-→0.75H→0H . . . as said first, second and third switching signals in said long recording mode while generating signals for selecting said fourth and fifth delay means so that delay amounts of said signals outputted from said luminance signal processing means are cycled in four fields as 0H→0.25H→0.5H→0.75H→0H . . . .

17. A magnetic video recorder in accordance with claim 14, wherein said first switching means includes:

first switch means including a first input end and first and second output ends, said first input end receiving said input video signals with said first output end being connected to said input end of said first delay means, for performing said first switching operation in response to said first switching signal from said switching signal generation means and outputting said video signals inputted in said first input end from said first or second output end, and second switch means including first and second input ends and a first output end, said first input end being connected to said output end of said first delay means with said second input end being connected to said second output end of said first switch means, for performing a switching operation in synchronization with said first switch means in response to said first switching signal, said second switching means includes:

third switch means including a first input end and first and second output ends, said first input end being connected to said first output end of said first switch means with said first output end being connected to said input end of said second delay means, for performing said second switching operation in response to said second switching signal, and fourth switch means including first and second input ends and a first output end, with said first input end being connected to said output end of said second delay means with said second input end being connected to said second output end of said third switch means, for performing a switching operation in synchronization with said third switch means in response to said second switching signal, said third switching means includes:

fifth switch means including a first input end and first and second output ends, said first input end being connected to said first output end of said fourth switch means with said first output end being connected to said input end of said third delay means, for performing said third switching operation in response to said third switching signal, and sixth switch means including first and second input ends and a first output end, said first input end being connected to said output end of said third delay means with said second input end being connected to said second output end of said fifth switch means while said first output end is connected to said input end of said color signal processing means, for performing a switching operation in synchronization with said fifth switch means in response to said third switching signal, said fourth switching means includes:

seventh switch means including a first input end and first and second output ends, said first input end being connected to said output end of said luminance signal processing means with said first output end being connected to said input end of said fourth delay means, for performing said fourth switching operation in response to said first switching signal, and eighth switch means including first and second input ends and a first output end, said first input end being connected to said output end of said fourth delay means with said second input end being connected to said second output end of said seventh switch means, for performing a switching operation in synchronization with said seventh switch means in response to said first switching signal, and said fifth switching means includes:

ninth switch means including a first input end and first and second output ends, said first input end being connected to said first output end of said eighth switch means with said first output end being connected to said input end of said fifth delay means, for performing said fifth switching operation in response to said second switching signal, and tenth switch means including first and second input ends and a first output end, said first input end being connected to said output end of said fifth delay means with said second input end being connected to said second output end of said ninth switch means, for performing a switching operation in synchronization with said ninth switch means in response to said second switching signal.

* * * * *

UNITED STATES PATENT AND TRADEMARK OFFICE
CERTIFICATE OF CORRECTION

PATENT NO. : 4,825,300

DATED : April 25, 1989

INVENTOR(S) : Nobuyasu OMORI

It is certified that error appears in the above-identified patent and that said Letters Patent is hereby corrected as shown below:

Column 1, line 56, change "bonds" to --bands--.

Column 2, line 38, change "an increase" to --a decrease--.

Signed and Sealed this

Eighth Day of May, 1990

*Attest:*

HARRY F. MANBECK, JR.

*Attesting Officer*  *Commissioner of Patents and Trademarks*